United States Patent
Raaz (10) Patent No.: US 9,428,339 B2
(45) Date of Patent: *Aug. 30, 2016

(54) CONVEYOR BELT SYSTEM

(75) Inventor: Viktor Raaz, Bochum (DE)

(73) Assignee: Thyssenkrupp Industrial Solutions AG, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/124,848

(22) PCT Filed: Jun. 6, 2012

(86) PCT No.: PCT/EP2012/060762
§ 371 (c)(1),
(2), (4) Date: Feb. 21, 2014

(87) PCT Pub. No.: WO2012/168335
PCT Pub. Date: Dec. 13, 2012

(65) Prior Publication Data
US 2014/0190797 A1    Jul. 10, 2014

(30) Foreign Application Priority Data
Jun. 8, 2011   (DE) ........................ 10 2011 050 937

(51) Int. Cl.
*B65G 15/08*    (2006.01)

(52) U.S. Cl.
CPC .................... *B65G 15/08* (2013.01)

(58) Field of Classification Search
CPC ..................................................... B65G 15/08
USPC ........................................................ 198/819
See application file for complete search history.

(56) References Cited

U.S. PATENT DOCUMENTS

| | | | | |
|---|---|---|---|---|
| 4,565,285 A | | 1/1986 | Koistinen | |
| 4,625,860 A | * | 12/1986 | Kawasaki | B65G 15/08 198/819 |
| 4,723,653 A | * | 2/1988 | Engst | 198/819 |
| 4,809,845 A | * | 3/1989 | Engst | B65G 15/08 198/819 |
| 4,958,724 A | * | 9/1990 | Hashimoto | B65G 15/08 198/819 |
| 5,080,221 A | * | 1/1992 | Steinkotter | B65G 15/08 198/819 |
| 5,150,783 A | * | 9/1992 | Hashimoto | B65G 15/08 198/819 |

(Continued)

FOREIGN PATENT DOCUMENTS

| | | |
|---|---|---|
| DE | 3506947 A1 | 8/1986 |
| DE | 102004051533 A1 | 3/2006 |

(Continued)

*Primary Examiner* — Thomas Randazzo
(74) *Attorney, Agent, or Firm* — Laurence A. Greenberg; Werner H. Stemer; Ralph E. Locher (57) ABSTRACT

A conveyor belt system includes a conveyor belt extending in a conveying direction and support roller arrangements spaced apart from each other along the conveyor belt and each having six support rollers annularly distributed around the outer periphery of the conveyor belt, thereby imparting a tubular shape to the conveyor belt. The support roller arrangements each include a first group having support rollers and at least one support roller offset relative thereto in the conveying direction and peripheral direction. A distance determined along the conveying direction between the first group of support rollers and the at least one support roller of the same support roller arrangement offset relative thereto measures between 15% and 85% of a distance between the first group of the support roller arrangement and the first group of the next support roller arrangement in the conveying direction.

8 Claims, 5 Drawing Sheets

(56) References Cited

U.S. PATENT DOCUMENTS

| | | | | |
|---|---|---|---|---|
| 5,161,675 A | * | 11/1992 | Engst | B65G 15/08 198/819 |
| 5,193,663 A | * | 3/1993 | Kuroda | B65G 15/08 198/819 |
| 5,232,084 A | * | 8/1993 | Simonsen | B65G 15/08 198/819 |
| 5,941,368 A | * | 8/1999 | Horak | B65G 15/08 198/819 |
| 6,079,551 A | * | 6/2000 | Horak | B65G 15/08 198/819 |
| 6,308,824 B1 | * | 10/2001 | Hinterholzer | B65G 15/08 198/819 |
| 7,942,259 B2 | * | 5/2011 | Steven | B65G 15/08 198/819 |
| 2004/0134759 A1 | * | 7/2004 | Tschantz | B65G 15/08 198/819 |
| 2007/0235289 A1 | * | 10/2007 | Brunone | B65G 15/08 198/701 |
| 2008/0283368 A1 | * | 11/2008 | Brewka | B65G 15/08 198/819 |
| 2010/0018841 A1 | | 1/2010 | Steven et al. | |
| 2011/0226591 A1 | * | 9/2011 | Neubecker | B65G 15/08 198/617 |

FOREIGN PATENT DOCUMENTS

| | | | | |
|---|---|---|---|---|
| GB | 2132970 A | | 7/1984 | |
| GB | 2242878 | * | 10/1991 | B65G 15/08 |
| GB | 2242878 A | * | 10/1991 | B65G 15/08 |
| JP | 08175642 | | 7/1996 | |

* cited by examiner

CONVEYOR BELT SYSTEM

BACKGROUND OF THE INVENTION

Field of the Invention

The invention relates to a conveyor belt system with a conveyor belt extending in a conveying direction and support roller arrangements spaced apart from each other along the conveyor belt, which each exhibit six support rollers annularly distributed around the outer periphery of the conveyor belt, thereby imparting a tubular shape to the conveyor belt, wherein the support roller arrangements each exhibit a first group with support rollers, and at least one support roller offset relative thereto in the conveying direction and peripheral direction.

Conveyor belt systems are used for transporting a wide variety of bulk materials, such as waste material, mineral ores, combustibles, building materials or the like. To this end, the conveyor belts often take the form of a trough on support rollers standing perpendicular to the conveying direction, or are molded into a tube and run through annularly arranged support rollers. The support rollers in a support roller arrangement are here as a rule supporting devices in the form of support roller stations, support roller festoons or support roller stools.

In a trough-shaped conveyor belt, three support rollers are usually situated on the support roller arrangements in the same cross sectional plane. Given an annular arrangement of six support rollers to form a tube, for example, it is known to divide the support rollers into a first group and a second group, wherein the support rollers in the second group exhibit an offset relative to the support rollers in the first group in a peripheral direction and in the conveying direction. The offset in the conveying direction is provided in particular to enable a certain overlapping of the support rollers that follow each other in the peripheral direction. Known in the art for a joint carrier in a support roller station is to arrange the support rollers in the first group on the first side of the carrier, and the support rollers in the second group on the second side of the carrier. The offset in the conveying direction between the support rollers in the first group and support rollers in the second group is slight in relation to the distance between consecutive support roller arrangements. Situating the support rollers on both sides of the carrier also results in a simplified assembly and maintenance.

A conveyor belt system with a conveyor belt molded into a tube is known from US 2010/0018841 A1, wherein the conveyor belt in the area of the support roller arrangements spaced apart from each other exhibits a shape approximating a polygon. This can be attributed to the fact that the conveyor belt abuts flatly against at least sections of the individual support rollers. This yields flat regions around the periphery separated by relatively strong bends. Outside of the support roller arrangements, the free-hanging conveyor belt assumes a roughly circular or oval cross sectional shape with an essentially uniform curvature.

Another conveyor belt system with a conveyor belt molded into a tube is known from JP 08175642 A, wherein support roller arrangements spaced apart from each other each exhibit six support rollers. In order to guide the conveyor belt molded into a tube around a curve, the six support rollers in a support roller station in a curved area are twisted relative to the six support rollers of the ensuing support roller station in the peripheral direction. However, a considerable bending force arises at both support roller stations, wherein the respective conveyor belt molded into a tube exhibits roughly the shape of a hexagon at the support roller arrangements. The six support rollers in a support roller arrangement are not divided up.

As a rule, the support roller arrangements in the form of support roller stations, support roller festoons or support roller stools consist of identically constructed support rollers located in the same peripheral position, which are distributed at about the same distance in the conveying direction over straight sections, wherein the distance between the individual support roller arrangements is best shortened in vertical and/or horizontal curves. The support roller arrangements are here situated along a polygonal line.

One important parameter for operating conveyor belt systems is the primary motion resistance, which is mainly determined by resistances to support roller running, indentation rolling, oscillatory bending and conveyed material tumbling. Most of the motion resistance can here be attributed to the last three resistances, which are also referred to together as the overall tumbling resistance. In particular in tubular conveyor belt systems, the overall tumbling resistance can comprise more than 90% of the primary motion resistance. The overall tumbling resistance is determined by a complex correlation involving the support roller design and configuration, the distance between the support roller arrangements, the tensile force, flexural rigidity and loading of the belt, the radii of curves along with other structural factors.

BRIEF SUMMARY OF THE INVENTION

The object of the present invention is to indicate a conveyor belt system that reduces the primary motion resistance, making it possible not just to reduce the drive energy, but also to diminish the tendency toward wear, and hence increase reliability.

Proceeding from a conveyor belt system with the features described at the outset, the object is achieved according to the invention by having the distance determined along the conveying direction between the first group of support rollers and the at least one support roller of the same support roller arrangement offset relative thereto measure between 15% and 85% of the distance between the first group of the support roller arrangement and the first group of the next support roller arrangement in the conveying direction.

In the present invention, the support rollers in a support roller arrangement distributed around the periphery are spaced a significant distance apart from each other viewed in the conveying direction. In this conjunction, the invention is based on the knowledge that the support rollers in a support roller arrangement situated essentially in a plane according to prior art represent a bottleneck of sorts, through which the conveyor belt and, in the filled state, the filler must be pressed or pulled.

The distribution of support rollers in a support roller arrangement can be used both in conveyor belt systems with a conveyor belt arranged like a trough, and in conveyor belt systems with a conveyor belt closed to form a tube. However, the advantages are especially significant for a conveyor belt closed to form a tube, since particularly strong geometric changes and bending forces are encountered there. In prior art, the support rollers in a support roller arrangement essentially situated in a plane set the cross sectional surface of a polygon around the entire periphery, leaving no space for the conveyor belt to expand, in particular in the filled state.

By contrast, within the framework of the invention, only a portion of the support rollers in the support roller arrangements abut against the conveyor belt at any one time as viewed in a cross sectional plane, leaving open spaces for the conveyor belt to expand in a radial direction. Deformation is distinctly lower by comparison to the cross sectional shape in an unsupported state, thereby clearly reducing the overall tumbling resistance within the framework of the invention.

According to the invention, the six annularly situated support rollers in a support roller arrangement are divided into two groups of support rollers spaced axially apart from each other. The division can here take place in various ways. In addition to a uniform division in which each group exhibits three support rollers, configurations with a division of 4:2 and 5:1 are also possible. In a 5:1 division, then, the first group exhibits five support rollers, while the second group exhibits only one support roller. At the location where the single support roller in the second group is provided, the first group thus correspondingly provides a free space in which the tubular belt can expand. For example, the lowermost support roller can be situated separately in a 5:1 configuration.

Even though distributing the support rollers in a support roller arrangement in a conveying direction is initially associated with an elevated structural outlay, far-reaching advantages do result as a whole. If the distance between consecutive support roller arrangements remains inherently unchanged, the energy required for driving purposes is considerably reduced, which is relevant in particular against the backdrop of increasing raw material costs. Given an identically configured system, a weaker and hence more cost-effective drive can be correspondingly also be provided, along with a correspondingly simplified energy supply. In addition, reducing the overall tumbling resistance also decreases wear on the conveyor belt, thereby increasing the service life given an otherwise unchanged configuration. A conveyor belt with a simpler design, and hence less resistance, can alternatively be used, wherein the reduced wear then still makes it possible to achieve a sufficient service life within the framework of the invention. This reduces material costs significantly with respect to the conveyor belt.

Also possible within the framework of the invention is to increase the distance between the support roller arrangements itself by dividing the individual support roller arrangements into groups. Proceeding from the first group of a support roller arrangement, the at least one support roller offset relative thereto forms an intermediate support, so that the conveyor belt is reliably guided. Finally, the intermediate support also makes it easier to guide the conveyor belt along curves. It must here be remembered that the conveyor belt is not supported along a curved arc by the spaced arrangement of support rollers, but rather along a polygonal line. While the support rollers in a support roller arrangement essentially lie in one plane in prior art, dividing the support rollers in the conveying direction yields an intermediate support within the framework of the invention, thereby also making the angular offset smaller. This intermediate support can either enable a narrow radius or increase the distance between the support roller arrangements.

Within the framework of the invention, the first group and second group can each exhibit three support rollers, which are arranged around the periphery at an angular pitch of 120° to each other in relation to the cross sectional surface. As revealed by a top view of the cross sectional surface, the support rollers in the one group are provided exactly at the gaps between the support rollers in the other group.

In order to achieve a notable reduction in the overall tumbling resistance, and hence in the primary motion resistance, within the framework of the invention, a significant offset must be provided in the conveying direction between the first group of support rollers and the at least one support roller offset relative thereto or the second group of support rollers. In the invention, the distance between the first group of support rollers and the at least one support roller offset relative thereto or the second group of the same support roller arrangement therefore measures between 10% and 90% of the distance between consecutive support roller arrangements, e.g., which is determined by the distance between the respective first group of the two support roller arrangements.

When determining the distances within the framework of the invention, the focus is not placed on the expansion of support rollers itself, so that the position of the rotational axes of the support rollers is always taken as the starting point. The support rollers in the first group and second group are each situated in roughly one plane. However, the support rollers in one group may for practical reasons be somewhat offset relative to each other in the conveying direction, wherein an average value must then serve as the basis for determining the distances.

A preferred embodiment of the invention provides that the distance determined along the conveying direction between the first group of support rollers and the at least one support roller offset relative thereto or the second group of the same support roller arrangement measure between 20% and 80%, especially preferably between 25% and 75% of the distance from the first group of the support roller arrangement to the first group of the next support roller arrangement in the conveying direction. In particular, the offset support roller or second group can be roughly centrally positioned between the first group of the accompanying support roller arrangement as well as the first group of the next support roller arrangement in the conveying direction. This further reduces the bending forces of the conveyor belt, and hence the overall tumbling resistance.

While all support rollers in a support roller arrangement can be situated on a shared supporting device in the form of a support roller station, support roller festoon or support roller stool, spacer arms or the like must then be provided to position the support rollers in the first group as well as the at least one support roller offset relative thereto at a sufficient distance in the conveying direction. In particular given a central positioning of the at least one offset support roller or the second group of support rollers between the first groups of support rollers of consecutive support roller arrangements, it can also be provided that the first group of support rollers on the one hand and the at least one support roller offset relative thereto or the second group of support rollers in the same support roller arrangement on the other be situated on supporting devices that are separated and spaced apart from each other.

The conveyor belt is best comprised of a flexible base material and traction means embedded herein. In particular steel wires or steel ropes consisting of several steel wires can be used as the traction means.

BRIEF DESCRIPTION OF THE SEVERAL VIEWS OF THE DRAWING

The invention will be described below based on a drawing that depicts just one exemplary embodiment. Shown on.

DESCRIPTION OF THE INVENTION

Figure 1:
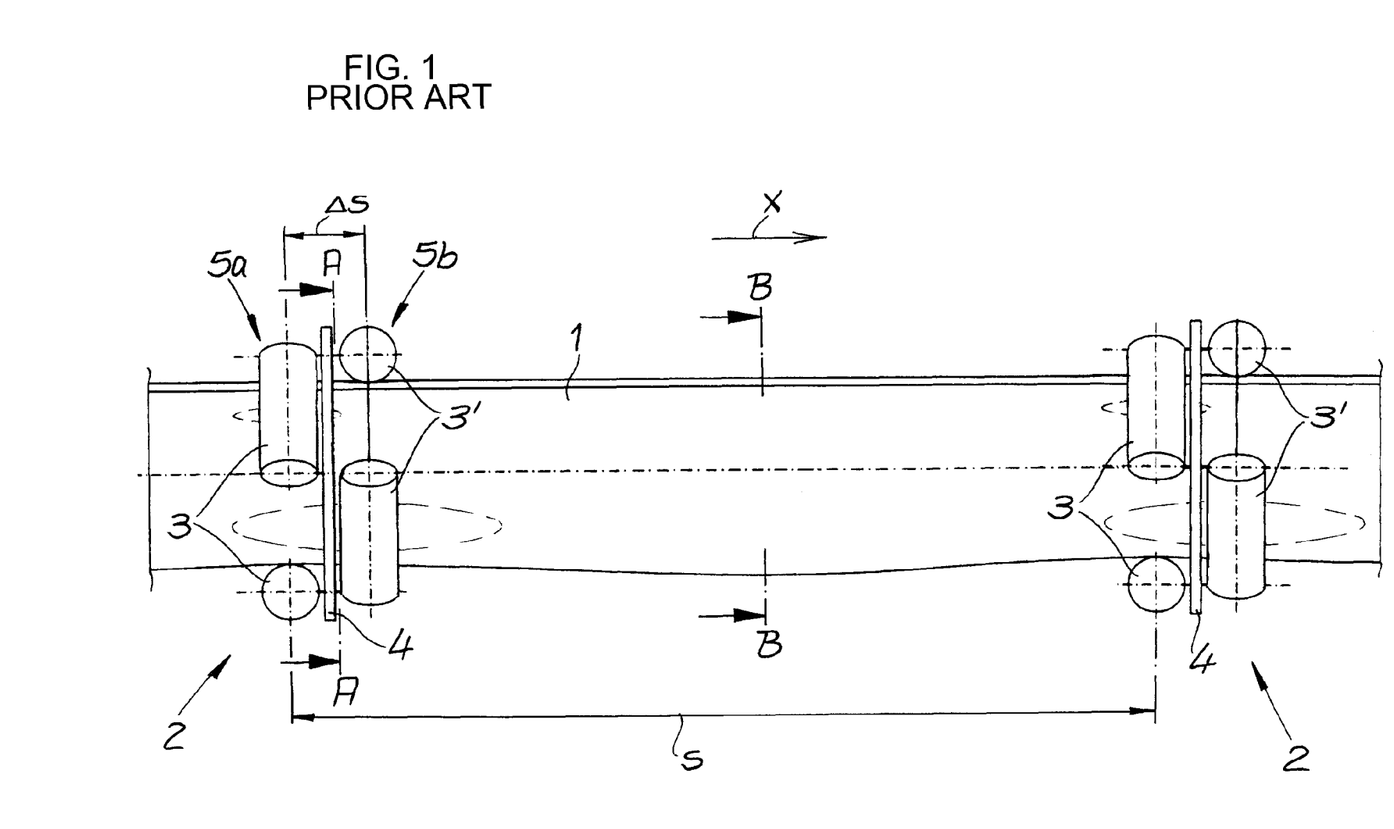
FIG. 1 is a side view depicting a section of a conveyor belt system according to prior art.

FIG. 1 shows a conveyor belt system according to prior art, which exhibits a conveyor belt 1 running in the conveying direction x and support roller arrangements 2.

Figure 2A:
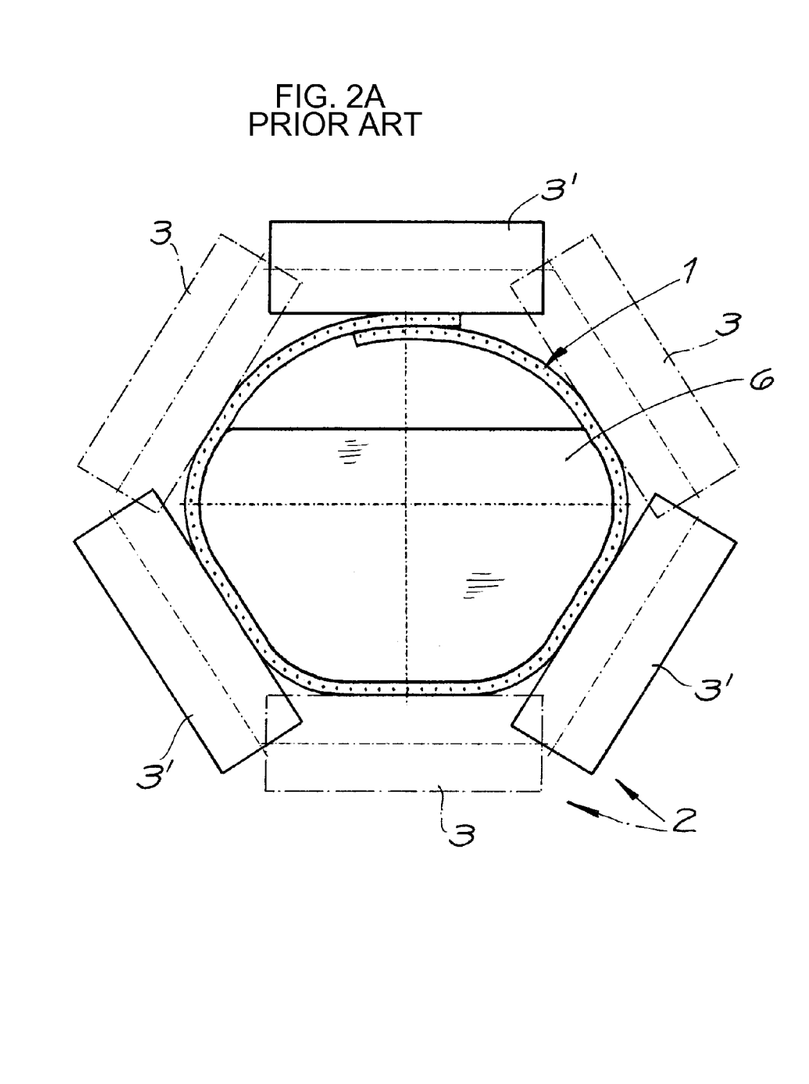
FIG. 2a is a cross section through the conveyor belt system in the area of a support roller arrangement (section A-A) on FIG. 1.

FIG. 2a shows a cross section of the conveyor belt 1 in the area of one of the support roller arrangements 2. As evident from a comparison between FIG. 1 and FIG. 2a, the conveyor belt 1 is molded into a tube by an annular arrangement of support rollers 3, 3'. The support rollers 3, 3' of a support roller arrangement 2 are situated on a shared carrier 4, wherein a first group 5a of three support rollers 3 is located on one side of the carrier 4, and a second group 5b of three support rollers 3' is located on the other side. Distributing the support rollers 3, 3' in two groups 5a, 5b on both sides of the carrier 4 enables a certain overlap between the peripherally consecutive support rollers 3, 3' in relation to the cross sectional surface (FIG. 2a), wherein the separate positioning also facilitates maintenance and assembly. The distance Δs between the first group 5a and second group 5b of support rollers 3, 3' in the conveying direction x is negligible by comparison to the distance s between the consecutive support roller arrangements 2 in the conveying direction x.

With respect to the deformation of the conveying belt 1, it can be assumed that all support rollers 3, 3' in a support roller arrangement 2 lie roughly in one plane.

Figure 2B:
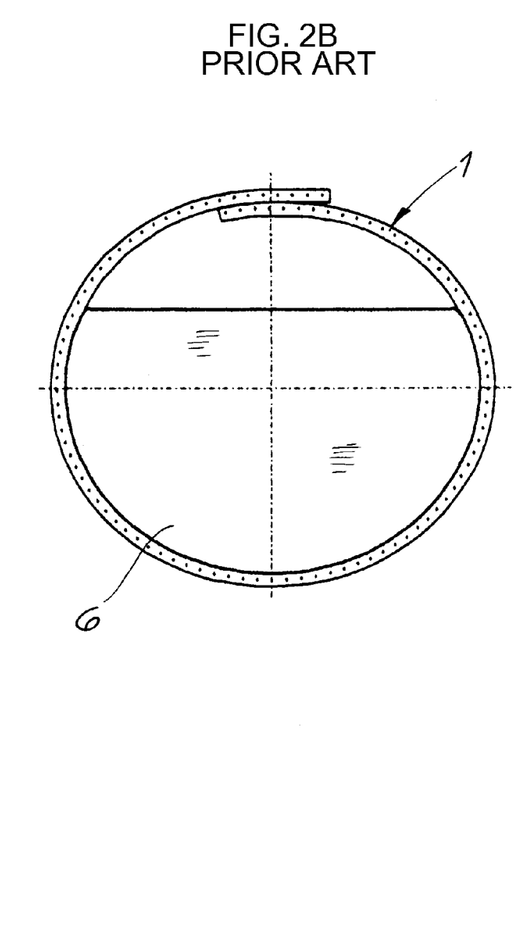
FIG. 2b is a cross section through the conveyor belt system according to FIG. 1 outside the support roller arrangements (section B-B)

While the conveyor belt 1 between the support roller arrangements 2 assumes an elliptical shape with an essentially uniform curvature when in a freely suspended state on FIG. 2b, the conveyor belt 1 and conveyed material 6 contained therein is subject to considerable bending forces and deformations in the area of the support roller arrangements 2 according to FIG. 2a. In this conjunction, the support rollers 3, 3' of in the support roller arrangements 2 lying essentially in one cross sectional plane represent a bottleneck, through which the conveyor belt 1 with conveyed material 6 contained therein must be pulled. The significant reshaping of the conveyor belt 1 and conveyed material 6 gives rise to large indentation rolling, oscillatory bending and conveyed material tumbling resistances, which must be overcome by a correspondingly strong driving mechanism. These resistances are significant in particular given a filled conveyor belt 1, and can dictate the essential percentage of energy needed for advancing purposes.

In a conveyor belt system, the conveyor belt is usually guided circularly as an endless band, or to a location along an upper run and back again along a lower run. For reasons of clarity, the figures only depict the movement by the conveyor belt 1 in the conveying direction x. Depending on the configuration, it can be provided that the unloaded conveyor belt 1 be returned below the depicted support roller arrangements 2. Comparable support roller arrangements can here also basically be provided.

FIG. 1 indicates the deformation of the conveyor belt 1 in the area of the support roller arrangements 2. As evident with respect to the lower edge of the conveyor belt 1, the conveyor belt 1 clearly sags between the support roller arrangements 2.

Figure 3:
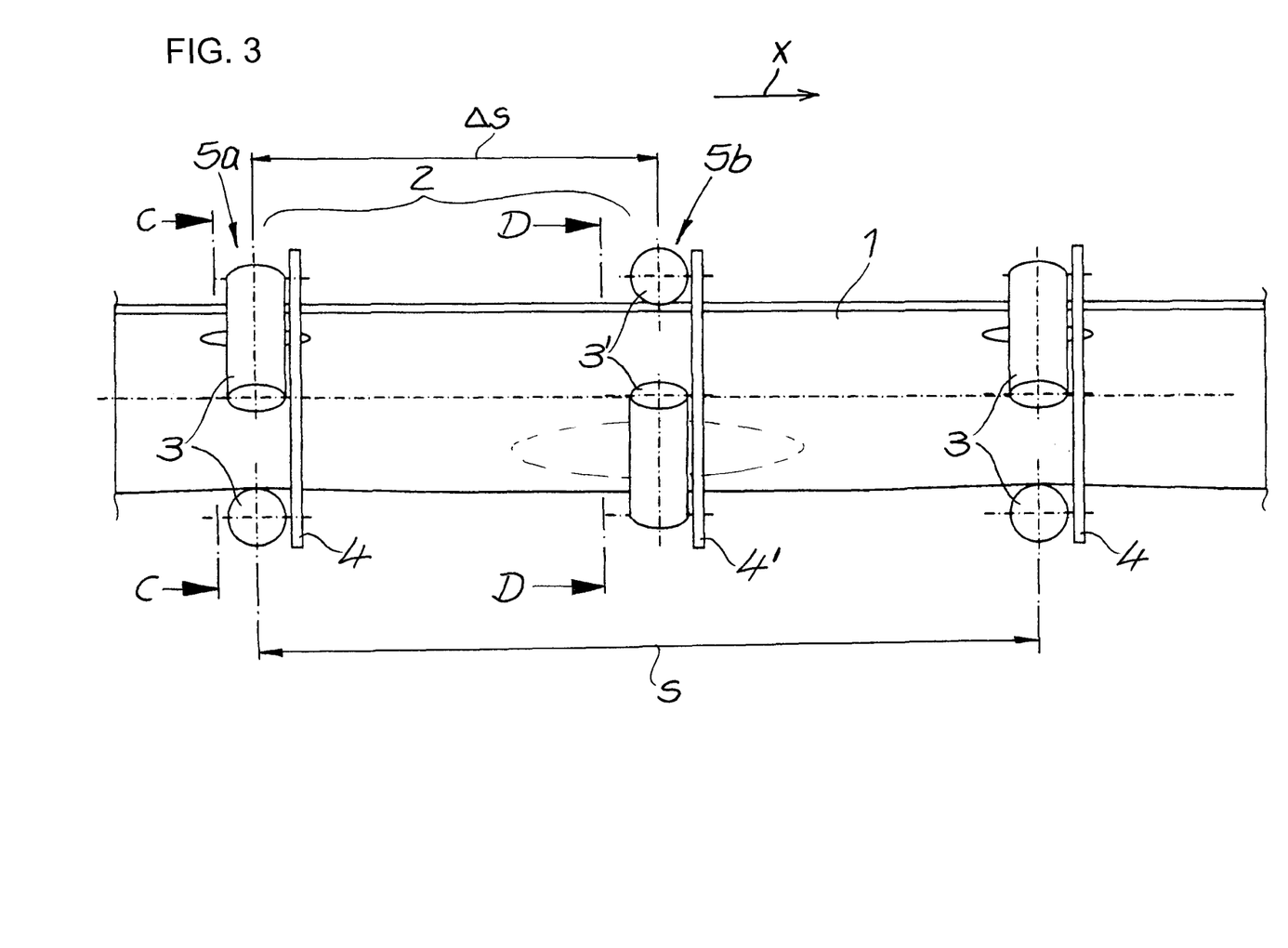
FIG. 3 is an embodiment of the conveyor belt system described in the invention in a view according to FIG. 1.

FIG. 3 shows an embodiment of the conveyor belt system according to the invention, wherein the invention states that the support rollers 3, 3' of the support roller arrangements 2 are situated in groups 5a, 5b distinctly spaced apart from each other. The first group 5a of support rollers 2 along with the support rollers 3' of the second group 5b offset relative thereto in the conveying direction x and peripheral direction are each situated on their own carrier 4'. In relation to the distance s between the consecutive support roller arrangements 2, the distance between the first group 5a and second group 5b of support rollers 3, 3' in a support roller arrangement 2 is now no longer negligible, and measures between 10% and 90%, preferably between 20% and 80%. FIG. 3 shows an especially preferred embodiment, in which the second group 5b of support rollers 3' is centrally positioned between the first group 5a of the allocated support roller arrangement 2 as well as the first group 5a of support rollers 3 in the next support roller arrangement 2.

Figure 4A:
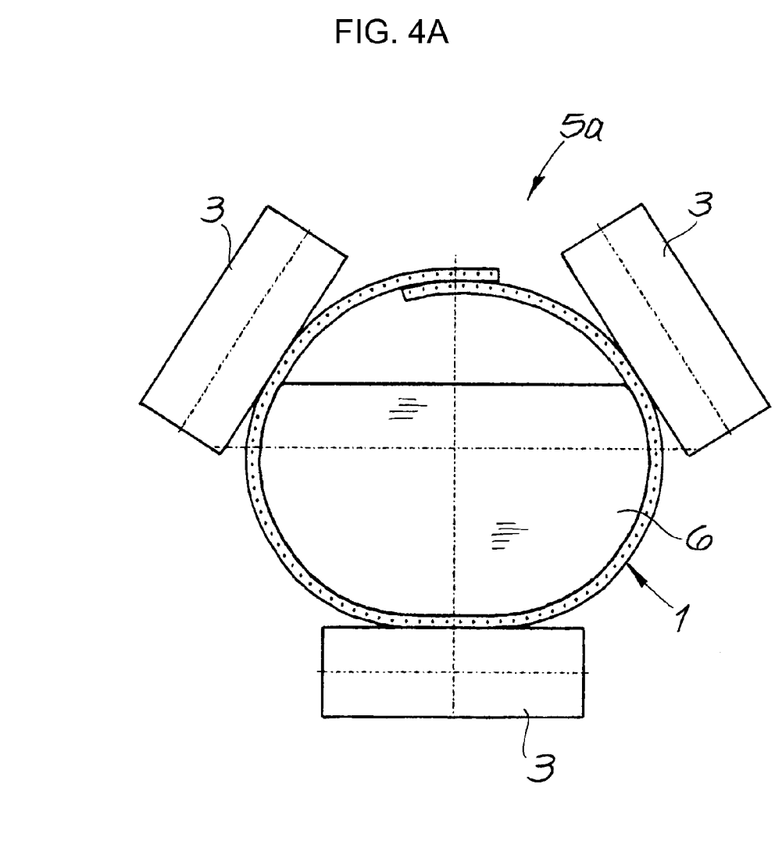
FIG. 4a is a cross section along the C-C line on FIG. 3.
Figure 4B:
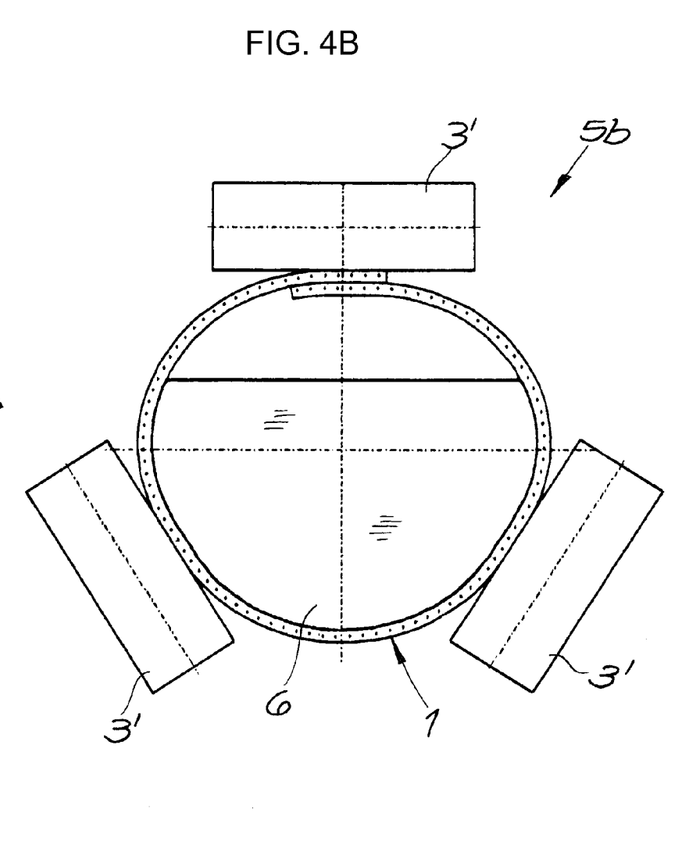
FIG. 4b is a cross section along the D-D line on FIG. 3.

As may be gleaned from FIGS. 4a and 4b, the conveyor belt 1 is subjected to distinctly less deformation on the distributed support rollers 3, 3', which reduces the motion resistance. Because free spaces are left between the support rollers 3, 3' situated in the first group 5a or second group 5b as viewed in the peripheral direction, the conveyor belt 1 with the conveyed material 6 contained therein can be more easily deformed. As a result, the conveyor material 1 and the conveyed material 6 contained therein is not forced as much to assume the cross sectional shape of a polygon, thereby also reducing the deviation from the circular or elliptical shape (FIG. 2b) assumed in the unprotected state.

The described advantages are qualitatively also obtained given another configuration of the conveyor belt system, for example when a trough-shaped conveyor belt is guided on support roller arrangements with three support rollers each.

Figure 5:
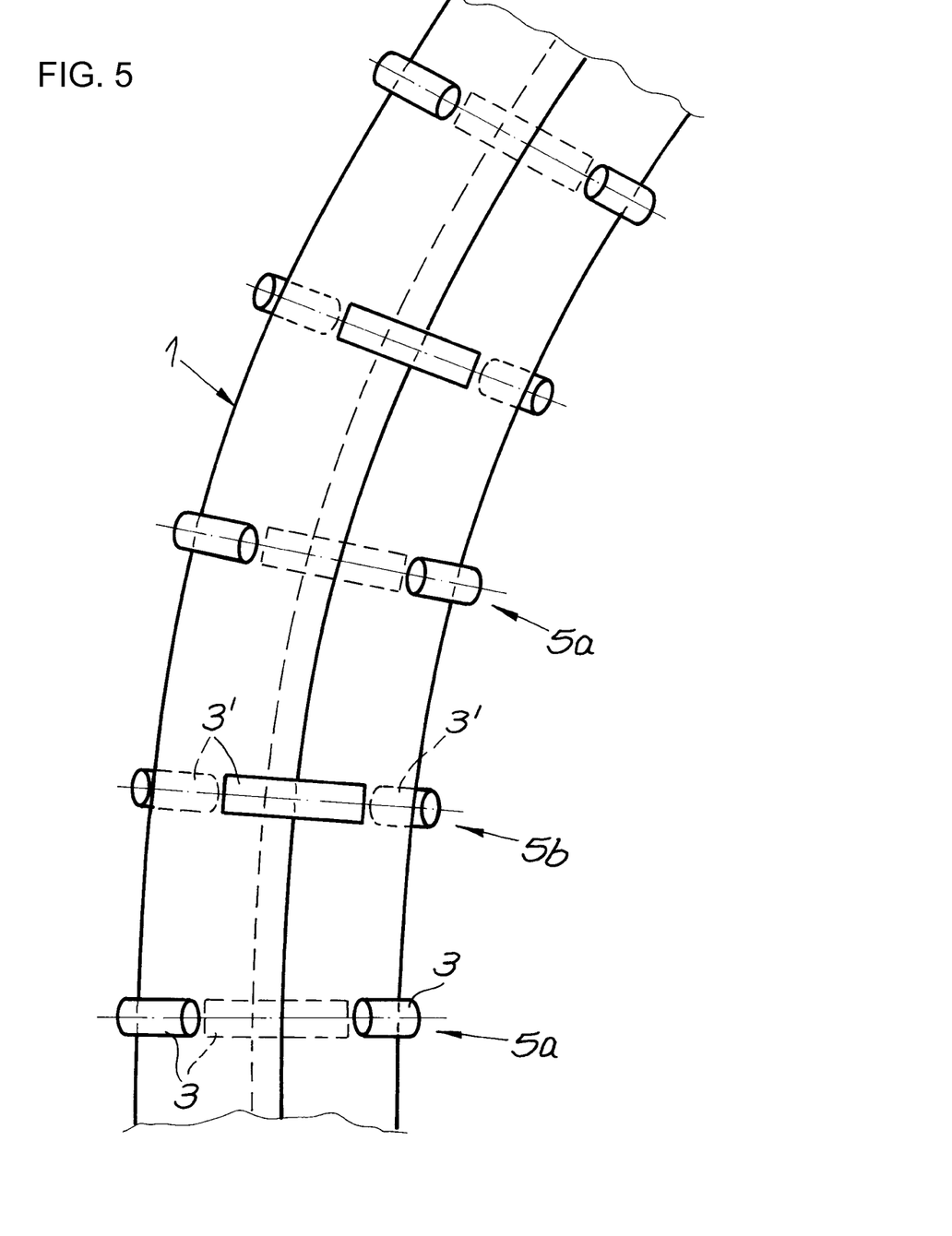
FIG. 5 is a top view depicting a section of the conveyor belt system at which the conveyor belt is guided along an arc.

As further evident from FIG. 3, dividing the support roller arrangement 2 into a first group 5a and a second group 5b of support rollers 3, 3' also enables an intermediate support for the conveyor belt. As a result, the conveyor belt 1 can be more easily guided along an arc, as shown by example on FIG. 5.

The invention claimed is:

1. A conveyor belt system, comprising:
    a conveyor belt extending in a conveying direction and having an outer periphery defining a peripheral direction; and
    support roller arrangements spaced apart from each other along said conveyor belt, each respective one of said support roller arrangements having six support rollers distributed annularly around said outer periphery of said conveyor belt and shaping said conveyor belt into a tube;
    said support roller arrangements each having a first group of support rollers and at least one support roller offset relative to said support rollers of said first group in said conveying direction and said peripheral direction;
    said first group of support rollers of one of said support roller arrangements being spaced apart from said first group of support rollers of a next one of said support roller arrangements by a first group to first group distance in said conveying direction;

within one of said support roller arrangements, said first group of support rollers and said at least one support roller offset relative to said support rollers of said first group, being spaced apart by a support roller to support roller distance determined along said conveying direction measuring between 15% and 85% of said first group to first group distance; and said at least one support roller being offset relative to said support rollers of said first group being positioned approximately centrally in said conveying direction between said first group of support rollers in said one support roller arrangement and said first group of support rollers in said next support roller arrangement.

2. The conveyor belt system according to claim 1, wherein said support roller to support roller distance measures between 20% and 80% of said first group to first group distance.

3. The conveyor belt system according to claim 1, wherein said support roller to support roller distance measures between 25% and 75% of said first group to first group distance.

4. The conveyor belt system according to claim 1, wherein said at least one support roller being offset relative to said support rollers of said first group, in said respective support roller arrangements, forms a second group of support rollers including at least one additional support roller being offset relative to said support rollers of said first group in said conveying direction and in said peripheral direction.

5. The conveyor belt system according to claim 4, wherein said first group and said second group each have three respective support rollers.

6. The conveyor belt system according to claim 1, which further comprises supporting devices being separated and spaced apart from each other, said first group of support rollers and said at least one support roller being offset relative to said support rollers of said first group each being situated on a respective one of said supporting devices in the same support roller arrangement.

7. The conveyor belt system according to claim 1, wherein said conveyor belt is composed of a flexible base material and traction devices embedded therein.

8. The conveyor belt system according to claim 1, wherein said support roller arrangements are located consecutively along a polygonal line running at least along a partial length of the system.

* * * * *